James H. Blessing's Steam Trap.

PATENTED JUN 27 1871

No. 116403

Witnesses:
R. Campbell
J. N. Campbell

Inventor:
James H. Blessing
by Mason, Fenwick & Lawrence

116,403

UNITED STATES PATENT OFFICE.

JAMES H. BLESSING, OF ALBANY, NEW YORK, ASSIGNOR TO HIMSELF AND FREDERICK TOWNSEND, OF SAME PLACE.

IMPROVEMENT IN STEAM-TRAPS.

Specification forming part of Letters Patent No. 116,403, dated June 27, 1871.

*To all whom it may concern:*

Be it known that I, JAMES H. BLESSING, of Albany, in the county of Albany and State of New York, have invented a new and Improved Steam-Trap; and I do hereby declare that the following is a full, clear, and exact description thereof, reference being had to the accompanying drawing making part of this specification, in which—

Figure 1:
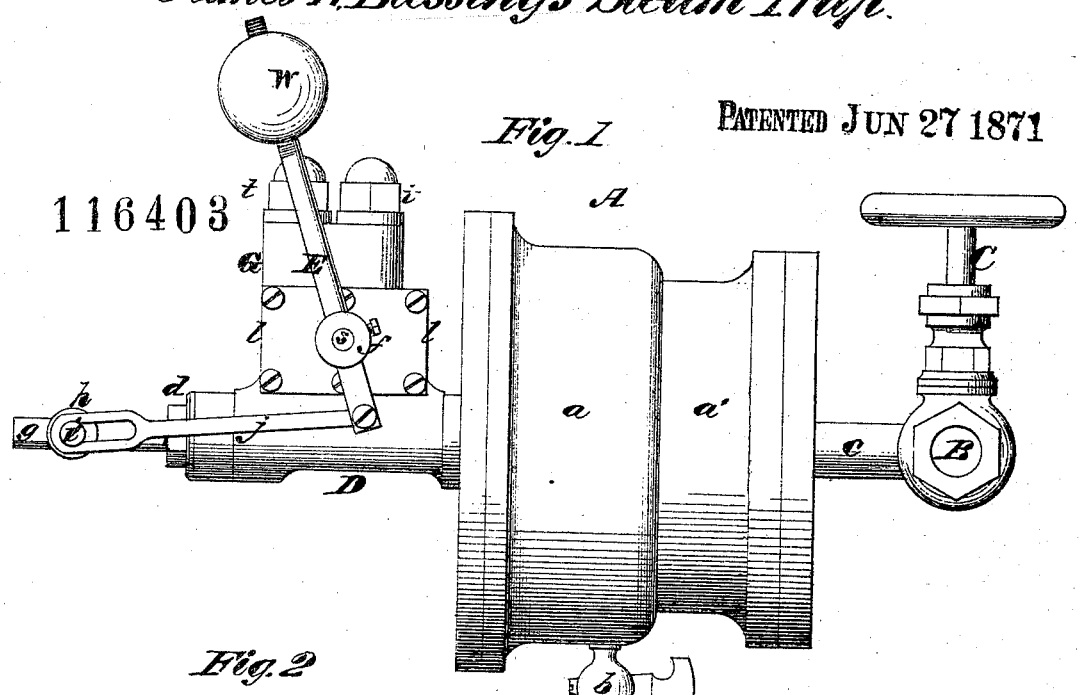
Figure 2:
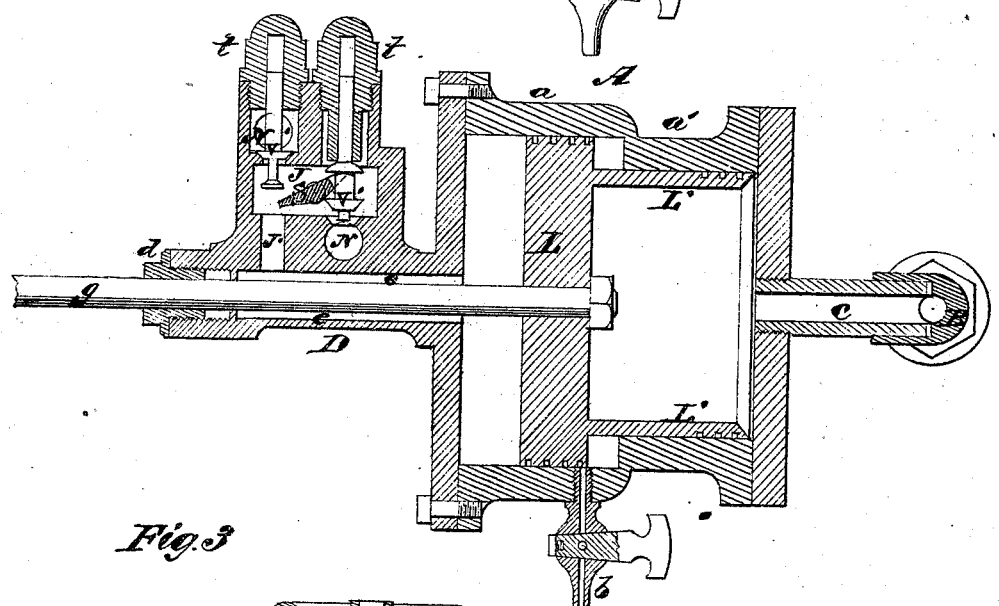
Figure 3:
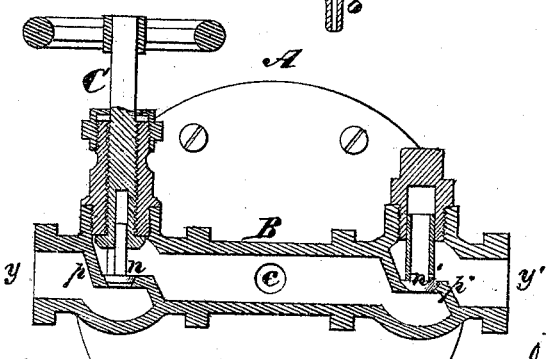

Figure 1 is a side elevation of the apparatus. Fig. 2 is a diametrical section through the apparatus. Fig. 3 is an end view of the piston-case and a section through the receiving and discharging valve-box.

Similar letters of reference indicate corresponding parts in the several figures.

This invention relates to certain novel improvements on the steam-trap for which application for Letters Patent was filed in the United States Patent Office on the 13th day of January, 1871. The object of my present invention is to effect the same results as set forth in the specification accompanying said application by means of a piston working in a case of suitable construction, as will be hereinafter explained.

The following description of my inventon will enable others skilled in the art to understand it.

In the accompanying drawing, A represents a cylinder or case, which is adapted to receive a piston, L L'. This cylinder A consists of an enlarged circular portion, $a$, for receiving the enlarged portion L of the piston, and a reduced circular portion, $a'$, for receiving the enlarged portion L of the piston, and a reduced circular portion, $a'$, for receiving the reduced hollow portions L' of the piston. The two portions L L' of the piston are suitably packed in their respective portions of the case A; and to this piston a rod, $g$, is secured, which extends through a tube, D, and through a stuffing-box, $d$, on the outer end of this tube. The tube D is made larger in diameter interiorly than the diameter of the piston-rod $g$, so as to leave a chamber, $e$, which communicates with the case A at one end, and with a valve-chest, G, at the other end. This chest G, represented in Figs. 1 and 2, is constructed and provided with valves, precisely as described in my aforesaid application for Letters Patent. The chamber $e$ communicates with a chamber, J, in said chest by means of a passage, J'. This chamber J communicates above with an inlet, N', through a valve-opening, which is provided with a spring-valve, V, opening upward. The chamber J also communicates with an outlet, N, through a valve-opening, V', opening upward. S is a tripping-rocker, which is arranged in chamber J, for raising the valves V V' alternately, and which is made fast to a horizontal stem, $s$, that passes outside of the chest through a stuffing-box, and has a vertically-slotted collar, $f$, and a loaded pendulum, E, applied on it. The collar $f$ is fast on the stem $f$, but the pendulum-rod E is applied loosely on this stem and passes through the slot which is through the collar. When the slot through the said collar is vertical the rocking trip S will be horizontal and both valves V V' will be shut. When the rod E, with its weight W, falls to one side of a vertical plane intersecting the axis of the stem $s$, one of the valves will be raised and the other will be shut. To the lower end of the pendulum-rod one end of a rod, $j$, is pivoted, the opposite end of which is slotted longitudinally and connected by a pin, $i$, to an arm, $h$, which is made fast to the piston-rod $g$. The chamber J is closed by a removable plate, $l$, which will allow access to the valves contained in the chest G; or these valves may be removed by unscrewing the caps $t\,t$. The arm $h$ is secured to the piston-rod, so that just as the piston completes a stroke toward the smallest end of the case A, as shown in Figs. 1 and 2, the pin $i$ will strike one end of the slot through rod $j$ and cause the tripping-rocker S to lift the valve V' and open the discharge-passage N, and allow valve V to shut the inlet-passage N'. When the piston is about to complete the opposite stroke the discharge-valve will be shut and the inlet-valve opened by the action of the pendulum and tripping-rocker, as described. To the smallest head of piston-case A a pipe, $c$, is connected, which establishes a communication between the chamber, which receives the hollow portion L' of the piston and the interior of a valve-box or pipe, B. This valve-box communicates at one end, $y$, with the steam or hot-water pipes used for warming the building, and at the other end $y'$ with a pipe leading into the boiler which supplies steam or hot water to the heaters. In this box B, nearest the receiving end $y$, is a partition, $p$, which is valve-seated and provided with an inlet-valve, $n$, provided with a regulating-screw, C. Nearest the opposite end $y'$ of this box B is a valve-seated partition, $p'$, provided with an outlet-valve, $n'$.

Water or steam, as the case may be, enters the piston-case A, on one side of the piston, through valve-opening $n$ and pipe $c$, and moves this piston toward the largest end of the piston-case. When this stroke is completed the outlet-valve $V'$ is shut and the inlet-valve V is opened, which allows water, steam, or compressed air, as the case may be, to enter the piston-case A and press the piston toward the smallest end of said case, thus forcing water which had accumulated therein through the opening closed by the valve $n'$ into the boiler again. At the termination of this last-described stroke the valve V is closed, so that all pressure against that part L of the piston of largest diameter is removed and the piston allowed to make the next stroke by the force exerted against its smallest end $L'$ unrestrained. In this way and by these means the condensed water which accumulates in the chamber on one side of the piston is automatically forced back into the boiler pure and hot.

In Figs. 1 and 2 I have represented a cock, $b$, applied to the case A, and communicating with an annular space which is left between that portion of the piston-case of smallest diameter. This cock is intended to allow the introduction of air and thus prevent the formation of a vacuum in said space. I consider it important in the operation of the apparatus to insure the easy working of the same. I also consider as important the hollowing out of portion of the piston of smallest diameter, although I do not confine myself thereto, as the entire piston might be made solid and the cock possibly be dispensed with.

I do not claim under this application for Letters Patent anything claimed under the application filed on the 13th day of January, as aforesaid.

What I do claim as new, and desire to secure by Letters Patent, is—

The piston $L\ L'$, whether constructed with its smallest part $L'$ hollow or solid, in combination with the piston-case A and the inlet and outlet attachments thereto, substantially as described.

JAMES H. BLESSING.

Witnesses:
A. P. STEVENS,
PETER J. CALLAN.